United States Patent

[11] 3,624,607

[72] Inventors Yoshinari Mita; Masamichi Shuto; Masahiro Moriwaki, all of Tokyo, Japan

[21] Appl. No. 14,526
[22] Filed Feb. 26, 1970
[45] Patented Nov. 30, 1971
[73] Assignee Nippon Electric Company, Limited Tokyo, Japan
[32] Priority Aug. 25, 1969
[33] Japan
[31] 44/67448

[54] APPARATUS FOR THE ELECTRONIC SELECTION AND IDENTIFICATION OF CHARACTERS
9 Claims, 7 Drawing Figs.

[52] U.S. Cl. .......... 340/146.3AH, 178/15, 178/30, 340/324 A
[51] Int. Cl. .......... G06k 15/18
[50] Field of Search .......... 340/146.3, 173 LM, 173 CR, 324; 315/18, 22; 178/15, 30

[56] References Cited

UNITED STATES PATENTS 3,274,581 9/1966 Moore et al. .......... 340/146.3
2,762,862 9/1956 Bliss .......... 178/15
2,816,246 12/1957 Bliss .......... 340/146.3 X
2,855,540 10/1958 Hoover, Jr. et al. .......... 340/173 CR
3,276,008 9/1966 Hauerbach .......... 340/146.3 X
3,550,094 12/1970 Norton .......... 340/173 CR

*Primary Examiner*—Maynard R. Wilbur
*Assistant Examiner*—Leo H. Boudreau
*Attorney*—Marn & Jangarathis

ABSTRACT: A system for electronically selecting characters, one at a time, from a matrix including a plurality of different characters spaced in columns and rows, a computer providing predetermined binary code signals, indicating particular character rows and columns in which the preselected characters are located, converting the binary code signals into corresponding voltages including successively increasing steps, using the converted voltages to move an electron beam to final positions proximate to the preselected characters, and thereafter moving the electron beam in a coordinate pattern to scan the latter characters, one at a time, to transmit appropriate output "1" and "0" video signals identifying the latter characters.

Fig. 4

INVENTORS
Yoshinari Mita, et al.
BY
Marn & Jangarathis
ATTORNEYS

INVENTORS
Yoshinari Mita, et al.
BY
Marn & Jangarathis
ATTORNEYS

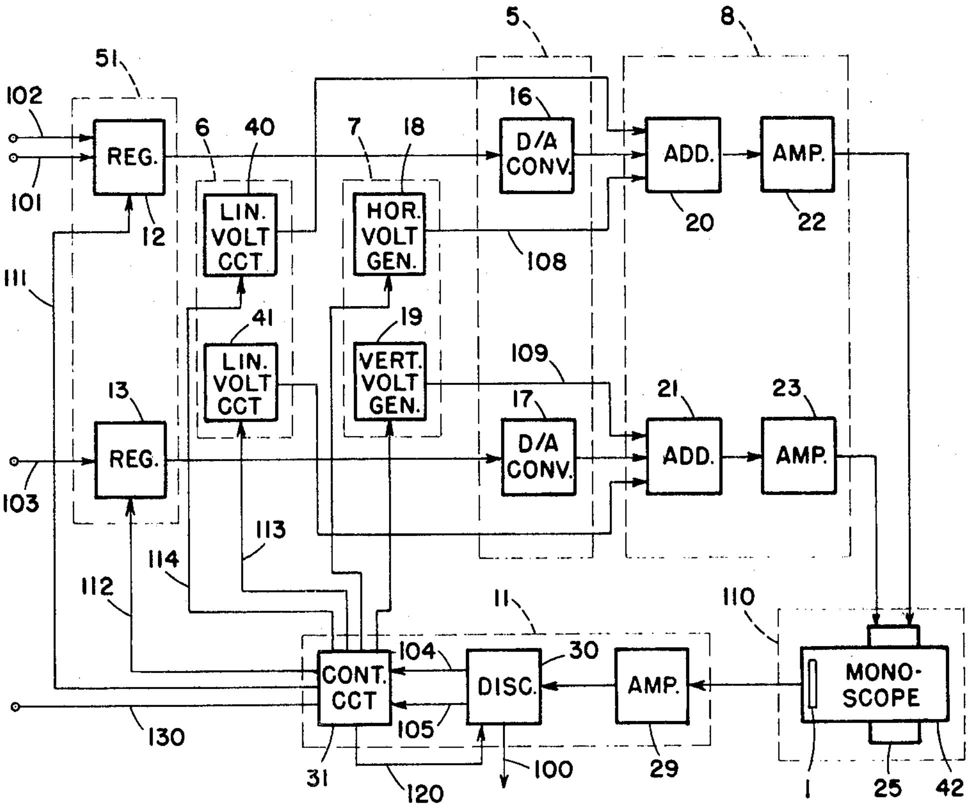
Fig. 7.
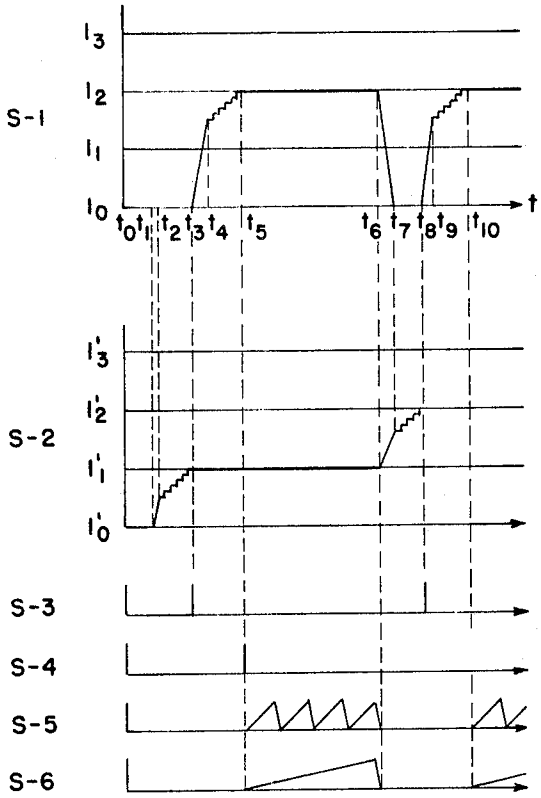
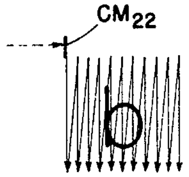
Fig. 5.
Fig. 6.
INVENTORS
Yoshinari Mita, et al.
BY
Marn & Jangarathis
ATTORNEYS

APPARATUS FOR THE ELECTRONIC SELECTION AND IDENTIFICATION OF CHARACTERS

This invention relates to apparatus for the electronic selection of characters for print or display in response to digital signals supplied by computers.

More specifically, this invention relates to a new and improved electronic character-selecting apparatus for realizing better legibility to such printed-out or displayed messages over those which are provided with conventional pattern generating systems.

Several systems involving the electronic selection of a symbol or a character have been heretofore proposed. In one of them, a flying-spot tube, a vidicon tube, or other suitable optical scanning means is combined with a symbol-character matrix plate. Another system, as the monoscope, consists of a combination of a symbol-character matrix plate and a light or an electron beam scanning device.

In these systems, the deflection of a light or an electron beam is electro-optically directed towards the designated character or symbol position in the matrix plate by use of an analog signal converted in response to the coded input from a computer corresponding to a predetermined position relative to the designated character or symbol in the matrix plate. Also, the scanning operation for the designated character or symbol is performed from such designated position as the scanning start point for producing the video signal for printing out or displaying such character or symbol.

For instance, one of such systems is described in a paper titled "High-speed Printing on Electrofax" published in RCA Review, Sept. 1961, pp. 585–589 discloses apparatus using a monoscope for the electronic selection for printing out a character with a binary input applied thereto from a computer.

This apparatus was found to have technical difficulties with respect to the precision and the stability of the analog signals for the character or symbol positioning as well as anode voltage fluctuation which affect the beam deflection sensitivity, especially in handling densely packed symbol-character matrices such as of 50×50 format. In other words, message characters produced from matrices containing large numbers of characters and symbols by employing such random selection and scanning means do not appear to have legibility—that is, message characters printed out from or displayed on a cathode-ray display tube were irregular in both vertical and horizontal alignment accompanying, at times, distorted, omitted, or incomplete character or symbol presentations due to a lack of uniformity in the scanning initiation points with respect to the designated character or symbol areas.

Also, it is to be understood that in order to display or print out intelligible messages in modern Japanese, matrices must be densely packed not only with alphanumeric characters and special symbols, but also with Chinese characters and Japanese "kana" letters. This inevitably has reduced the legibility of the displayed message characters because of the previously mentioned reasons.

It is, therefore, an object of this invention to provide a new and improved electronic character-selecting system which would appear to overcome all the above-mentioned disadvantages inherent in the conventional systems and which is capable of selecting and scanning any designated character or symbol with high positional precision and stability in response to a binary-coded digital-coded signal supplied from a computer.

The electronic character-selecting according to this invention comprises means for generating and controlling the deflection of an electron or a light beam, means for temporarily registering a character-designating binary-coded signal supplied with an electronic computer, means for converting the registered character-designating binary-coded signal into an analog signal, means for deflecting the beam in response to the analog signal, means for compensating the deflection of the beam roughly positioned by the analog signal, means for scanning a designated character within preassigned area by a properly positioned beam, means for converting the intensity of the beam into an electrical signal representing the designated character as scanned, and means for controlling the deflection of the beam in a coordinate pattern in response to a signal produced by the beam-converting means.

In the system of this invention, the deflection of the beam is finely compensated after the beam spot has been temporarily roughly positioned in the proximity to a character row-indicating mark for the designated character in response to the coded signal for designating the character position from the computer, and thereby the detection of the character row-indicating mark and the positioning of the beam in the row direction is performed. Then, the beam spot is positioned in the proximity to a character column-indicating mark for the designated character and the compensation of the beam spot position is continued until the character column-indicating mark is detected. Similarly, the positioning of the beam to the designated position of the character is carried out. From the latter position, the designated character within its occupational area is horizontally and vertically scanned by the beam so that any character or symbol in the matrix plate can be printed out of displayed with high positional accuracy and with high legibility.

Also, as it is understood from the foregoing, the beam spot can be accurately positioned at the scanning initiation point without fail, regardless of the changes in amplitude of the analog signals or in voltage of the power supply.

The present invention is now described in detail in conjunction with the accompanying drawings, in which;

FIG. 5 shows schematically a beam-scanning pattern for a designated character in FIGS. 2 and 3;

FIG. 6 shows various signal waveforms produced in FIGS. 2 and 3; and

FIG. 7 shows a block diagram of another embodiment of the invention.

Figure 1:
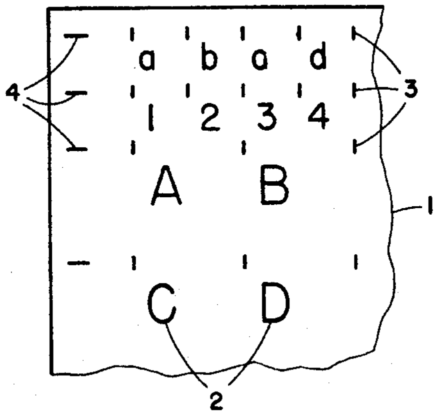
FIG. 1 shows schematically a fragmentary example of a matrix designed for the explanation of this invention as illustrated in FIGS. 2–7.

In FIG. 1, any of the alphanumeric characters 2 in the matrix 1 is assigned in an area which has predetermined unit width and height or integer multiples thereof and that a character column-indicating mark 3 of a vertically oriented short dash is provided on the left shoulder of each character-assigned area (for instance, by the photoetching technique) and a character row-indicating mark 4 of a horizontally oriented long dash is provided for each row in the left margin of the matrix 1. Also, each of the character row-indicating marks 4 is so designed as to intersect, if extended, each of the character column-indicating marks 3 in the same row direction. Furthermore, any character row-indicating mark 4 and its corresponding first-column character-indicating mark 3 are spaced at a distance equal to or an integral multiple of the spacings between two adjacent character column-indicating marks 3 in the same row, and further all the marks 4 constitute one column. It is assumed that the marks 3 and 4 and all of the characters in FIGS. 1 and 4 are optically transparent while the remainder of matrix 1 is optically opaque.

Figure 2:
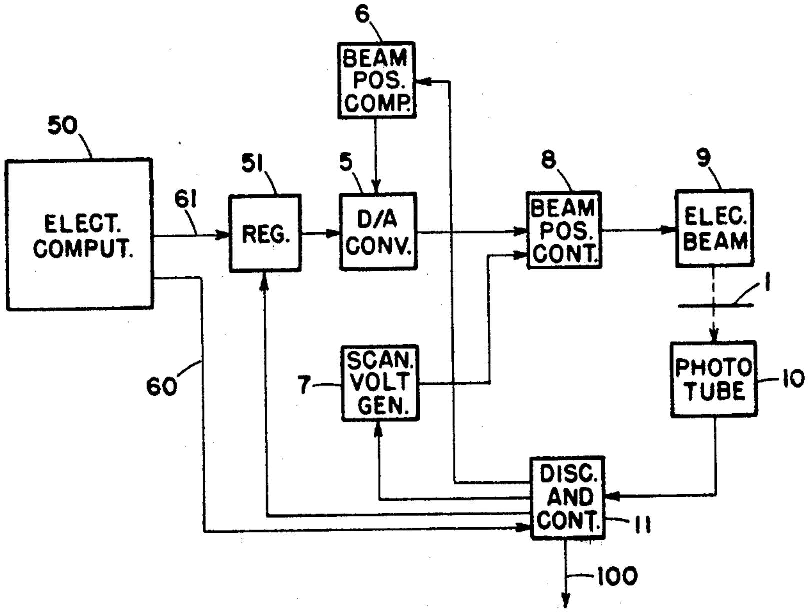
FIG. 2 shows a simplified block diagram illustrating one embodiment of the invention.
Figure 4:
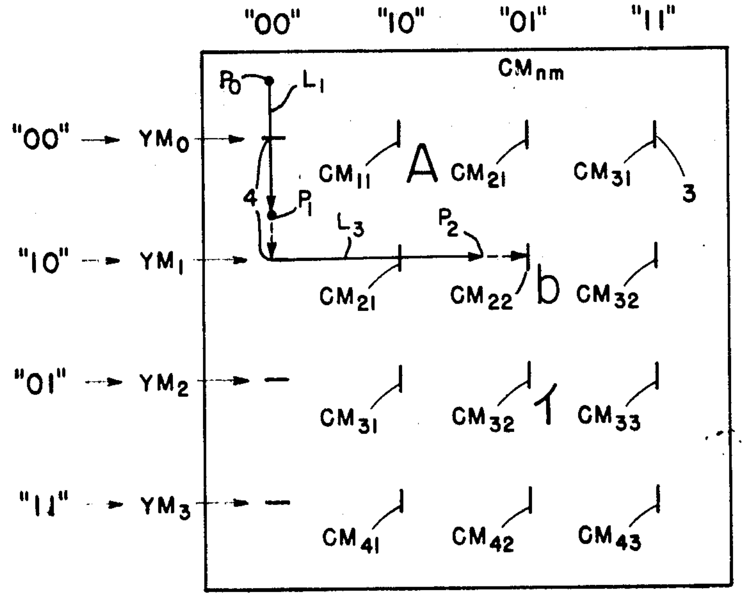
FIG. 4 shows a matrix designed for explaining the operation of FIGS. 2 and 3.

In FIG. 2, an apparatus according to this invention for the electronic selecting and identifying a character or symbol in the matrix 1 of FIG. 4 is now outlined. This apparatus in FIG. 2 initiates the operation upon receipt of a command signal on lead 60 and predetermined binary-coded "0" and "1" signals on lead 61 as originated in electronic computer 50 for initiating the selection and scanning of a designated character in FIG. 4 and stores the binary-coded signals in a register 51 under control of voltage responsive and discriminating control means 11. Then, the coded signal corresponding to the position of the character row-indicating mark 4 for the row direction in which the character to be selected occupies in FIG. 4 is converted by a digital-analog converter 5 into an analog signal (voltage) which is supplied to an electron beam control means 8 for controlling the beam spot position on the matrix 1. The output signal from the control means 8 controls an electron beam or a light beam generating means 9 (such as a flying-spot tube) to cause the electron or the light beam (simply referred to as the beam hereinafter) to be deflected in a coordinate pattern and the beam spot to be positioned near the character row-indicating mark 4 corresponding to the designated character. Then, a beam position compensating means 6 initiates the compensation operation of the beam position in the row direction under the control of the discriminating and control means 11 (for discriminating that the beam has arrived at the proper one of the character row indicating marks and controlling the latter compensating operation in a manner explained hereinafter).

At the time the beam is incident upon the mark 4, indicating the character row in FIG. 4 in which the designated character is located, this is detected by means 10 (such as a photomultiplier tube) for converting the beam intensity into an electrical signal. This activates the discriminating and controlling means 11 to suspend the compensating operation by the beam position compensating means 6, thereby holding the position of the beam in the character row direction. At the same time, the binary code signal stored in the register 51 and corresponding to the position of the character column-indicating mark 3 for the designated character is translated by the digital-analog converter 5 into a second analog signal (voltage) for moving the beam to a new position. In this case, the first-mentioned analog signal amplitudes relative to the character row direction remain unchanged. Therefore, the beam generated by the beam-generating means 9 activated by the second analog voltage via the beam position control means 8 moves on the same horizontal level as the mark 4 indicating the character row in FIG. 4 in which the designated character is located to take a tentative position in the proximity of the character column-indicating mark 3 nearest to the designated character. This tentative position is then changed by the beam position compensating means 6 to a new position at which the beam is incident on the last-mentioned character column-indicating mark 3. As soon as the beam is incident on the last-mentioned character column-indicating mark 3, this is detected by the photomultiplier means 10 which thereupon produces a voltage to activate the voltage responsive and discriminating control means 11 to suspend the compensating operation of the beam position compensating means 6. Through the above-mentioned sequence of operations, the beam has completed its movement to a position nearest to the designated character. Then, the discriminating and control means 11 causes a scanning signal-generating means 7 to produce the necessary sawtooth voltages which are applied via beam position control means 8 to activate beam means 9 to move the beam to scan a predetermined area containing the designated character, whereby the photomultiplier means 10 responsive to the beam incident thereon via the transparent scanned character produces an electrical signal output corresponding to the pattern of the designated character in FIG. 4 as scanned. This signal output is applied through the voltage responsive and discriminating means 11 to a signal line 100 for conversion into a corresponding visual or printed character pattern. At the termination of the scanning of one designated character, the operation similar to that mentioned above for the next-designated character is initiated.

Figure 3:
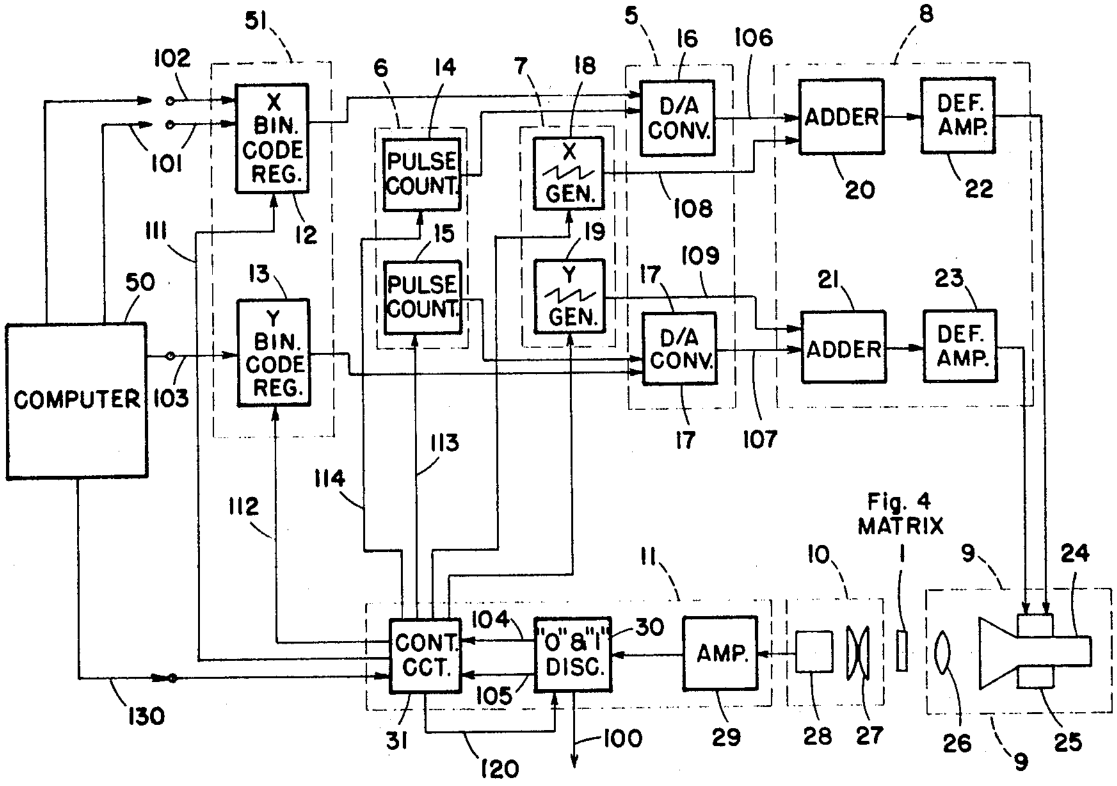
FIG. 3 shows a block diagram illustrating in detail the embodiment of FIG. 2.

A more detailed explanation of the embodiment of the electronic character-selecting apparatus of the invention according to FIG. 2 is now given in conjunction with FIG. 3. The matrix 1 is composed of four equally spaced rows and columns as shown in FIG. 4 in which the left end column contains four character row-indicating marks 4, while each of the remaining three columns contains four character column-indicating marks 3.

For instance, the character row-indicating marks 4 are named from the top to the bottom, as $YM_0$, $YM_1$, $YM_2$, and $YM_3$, respectively, and the character column-indicating marks 3 are denoted by $CM_{nm}$, wherein subscripts $n$ and $m$ denote respectively $n$th row and $m$th column as counted from the top row and the left end column. For example, the mark 3 for the character A is denoted by $CM_{11}$ and that for Japanese "kana" letter $\rho$ by $CM_{31}$.

In FIG. 3, upon receipt of the binary-coded signals designating a character in FIG. 4 in response to appropriate actuation of electronic computer 50, an X-register 12 selectively and temporarily memorizes a two-bit coded signal applied via a signal line 101 for designating the column in which the designated character occurs and a two-bit coded signal applied via a signal line 102 for designating the column in which the mark 4 exists, under control of a voltage-responsive control circuit 31 activated by a command voltage provided on lead 130 to initiate the operation of FIG. 3. The two-bit coded signal is, for example, expressed by a two-bit code such that, in designating the first character column (i.e., column 2) in the matrix 1, the $2^0$ and $2^1$ bits are "1" and "0"; in designating the second character column (i.e., column 3) they are "0" and "1"; in designating the third character column (i.e., column 4) they are both "1." Furthermore, the $2^0$ and $2^1$ bits for the character-designating coded signal prepared for designating the column (i.e., column 1) in which the marks 4 exists are both "0." A Y-register 13 temporarily memorizes a two-bit coded signal applied via a signal line 103 for designating the row in which the designated character occurs under control of the control circuit 31. The coded signal for designating the row for the designated character is expressed, for instance, by a two-bit code such that, in designating the first row in the matrix, the $2^0$ and $2^1$ bits are both "0"; in designating the second row they are "1" and "0"; in designating the third row, they are "0" and "1"; in designating the fourth row, they are both "1." The X- and Y-registers 12 and 13 are respectively connected to digital-to-analog converters 16 and 17. To the upper input terminal of the converter 16 are supplied the $2^1$ and $2^0$ bits of the X-register 12 so as to correspond to the most significant bit and the second bit in the converter 16, respectively. Furthermore, to the lower input terminal of the converter 16 a bit counter 14 is connected in such a manner that the most significant bit in the counter 14 corresponds to the third bit in the converter 16 and the least significant bit (the fourth bit) corresponds to the least significant bit in the counter 14. The output signal of the converter 16 controls, through an adder 20, a deflection amplifier 22, and a deflection coil 25, the deflection of the light beam in a flying-spot tube 24 regarding the column (horizontal) direction in the matrix 1. For instance, when a coded signal "10" for designating the first character column is applied to the X-register 12, the output signal of the register 12 controls the deflection of the light beam so as to position the latter between $YM_n$ ($n$ is the character row-indicating mark 4) and $CM_{nl}$ (1 is the first character column-indicating mark 3) as shown in FIG. 4. Similarly, when a coded signal "01" for designating the second character column is applied to the X-register 12, the output signal of the latter register controls the deflection of the light beam in such a manner that the light beam is positioned between the marks $CM_{n1}$ and $CM_{n2}$. Also, when a coded signal "11" for designating the third column is applied to the X-register 12, the light beam is so controlled by the output signal of the latter register as to be positioned between the marks $CM_{n2}$ and $CM_{n3}$.

Furthermore, when a coded signal "00" for designating the first column in which the marks 4 occur is stored in the X-register 12, the light beam is so controlled by the signal output of the latter register as to be positioned between the adjacent character row-indicating marks 4 forming the column. The converter 17 is connected to the Y-register 13 and a bit counter 15 in a similar manner to that of the converter 16 and the register 12. Also, the output signal of the register 13 controls the light beam regarding the row (vertical) direction of the matrix 1 through an adder 21, a deflection amplifier 23, and the deflection coil 25. For instance, the light beam is so controlled as to be located at a position above the mark $YM_0$ when the light beam is positioned at the column formed by the marks 4 and a coded signal "00" designating the first row is applied to the Y-register 13. Similarly, the light beam is moved to position itself between the marks $YM_0$ and $YM_1$ when a coded signal "10 " designating the second row is sent to the converter 17; to a position between the marks $YM_1$ and $YM_2$ when a coded signal "01" designating the third row is sent to the converter 17; and to a position between the marks $YM_2$ and $YM_3$ when a coded signal "11" designating the fourth row is sent to the converter 17.

The counters 14 and 15 are connected to the third and lower order bit of the converters 16 and 17, respectively, and count the pulses to cause the outputs S–1 and S–2 of the converters 16 and 17, respectively, to be varied in equal-step pulses as indicated in the time intervals $t_4$–$t_5$ and $t_2$–$t_3$ in FIG. 6. For this reason, the light beam position tentatively positioned by the contents of the X- and Y-registers 12 and 13 before the step operation of the respective voltages in the outputs of converters 16 and 17 is finally positioned in the manner above described subsequent to such voltage step operation.

The bit numbers for the counters 14 and 15 must be so chosen that the steps for such compensating operation may become sufficiently fine, thereby ensuring the infallible detection of both character column-indicating mark and character row-indicating mark positions.

The control circuit 31 controls the counters 14 and 15 to count the pulses and holds the counted contents. An X-scanning sawtooth wave signal generator 18 and a Y-scanning sawtooth wave signal generator 19 generate the horizontal and vertical scanning signals for scanning the designated character, respectively, by the light beam after the character position has been selected under control of the control circuit 31. A lens system 26 focuses the light beam from the flying-spot tube 24 on the matrix 1, and a condenser lens 27 diverges the light beam passing through the matrix 1 on a photomultiplier tube 28. The electrical signal converted by the tube 28 is amplified and wave-shaped for converting such signal into a virtual two-level video signal "1" or "0" by the amplifier 29. Also, such converted signal is discriminated by a discriminator 30. The output of the amplifier 29 takes a "1" or a "0" state according as the light beam is incident on the transparent characters 2, the marks 3, and the marks 4 and on the opaque portions, respectively. Furthermore, the output of the amplifier 29 is discriminated as to whether it is a character row-indicating mark signal to supply to the signal line 104 or a character column-indicating mark signal to supply to the signal line 105 or the character pattern-representing signal to supply to the signal line 100 by the discriminator 30 under the control of the control circuit 31. More specifically, the output signal of the amplifier 29 is so controlled as to supply (1) to signal line 104 during the time interval from the initiation of counting by the counter 15 and that of compensating operation to the detection of any one of the marks 4, (2) to signal line 105 during the time interval from the initiation of counting of the counter 14 to the detection of any one of the marks 3, and (3) to signal line 100 during the time interval in which the designated character is being scanned. Such initiation operation of the counters 14 and 15 is detected by the discriminator 30 supplied with a control signal via a signal line 120 from the control circuit 31.

It is seen that those circuit components enclosed by broken lines in FIG. 3 correspond to blocks with like numerals in FIG. 2.

Some examples of the operations performed by the electronic character-selecting apparatus according to this invention is now described with reference to FIGS. 3 through 6. For example, such operations are explained hereinafter about characters *b* and ァ (a "kana" letter) in the matrix 1 as shown in FIG. 4 in succession.

FIG. 6 shows the signal waveforms at various points in the circuit of FIG. 3. In FIG. 6, the abscissa shows the time axis in each case and the ordinate shows signal levels. In FIG. 6, S–1 illustrates the output signal waveform of the converter 16 appearing on the signal line 106, and $l_0$, $l_1$, $l_2$, and $l_3$ denote respectively the analogue signal levels in the first column direction of the four marks 4, the marks $CM_{n1}$ in the first character column, the marks $CM_{n2}$ in the second character column, and the marks $CM_{n3}$ in the third character column; S–2 illustrates the output signal waveform of the converter 17 appearing on the signal line 107 and $l_0'$, $l_1'$, $l_2'$, and $l_3'$ denote respectively the analog signal levels in the row directions of the marks $YM_0$, $YM_1$, $YM_2$, and $YM_3$; S–3 illustrates the waveform of the character row-indicating mark signal appearing on the signal line 104; S–4 illustrates the waveform of the character column-indicating mark signal waveform appearing on the signal line 105; S–5 illustrates the waveform of the Y-scanning sawtooth wave signal appearing on the signal line 109; and S–6 illustrates the waveform of the X-scanning sawtooth wave signal appearing on the signal line 108.

Upon receipt of the character selecting and scanning command signal from information processing system such as the electronic computer via a signal line 130, the control circuit 31 initiates the selection operation for the designated character. Then, the control circuit 31 controls to cause a two-bit signal "10" designating the second row in the matrix 1 including the position of the character *b* to be sent on line 103 and a two-bit signal "00" designating the column in which the row-indicating mark group exists to be sent via line 102 under the supervision of control signals on signal lines 112 and 111 in the Y-register 13 and the X-register 12, respectively, at the time $t_1$ in FIG. 6. In this case, the counters 14 and 15 are both cleared, and the operation of the X- and Y-scanning sawtooth wave signal generators 18 and 19 are suspended.

The signal contents ("00" and "10") stored in the X- and Y-registers 12 and 13, respectively, are converted by the converters 16 and 17 into corresponding analog signals, respectively, as represented by the waveform variations of the voltages S–1 and S–2 from time $t_1$ to time $t_2$ in FIG. 6. Such analog signals S–1 and S–2 are applied to the deflection coil 25 through the adders 20, 21, and the deflection amplifiers 22, 23, respectively. The light beam in the flying-spot tube 24 is caused to deflect by the deflection coil 25 as energized by the voltage S–2 to an arbitrary point between the character row-indicating marks $YM_0$ and $YM_1$ in FIG. 4. In other words, the beam spot is positioned at point $P_0$ and moves from point $P_0$ to point $P_1$ along the solid line $L_1$ in the direction indicated by the arrow under the influence of the voltage S–2. Point $P_0$ is a point at which the beam was incident just prior to the selection of the character *b*, but it is 'y no means necessary that the point be so situated as illustrated. Then, the counting operation of the counter 15 is initiated via a signal line 113 by the control circuit 31 and the contents of the counter 15 are applied to the converter 17 together with the contents of the Y-register 13.

The output level of the converter 17, which varies in sufficiently fine steps in accordance with the counted contents of the counter 15 (as represented by the waveform variations of the voltage S–2 from $t_2$ to $t_3$ in FIG. 6), is applied through the adder 21 and the deflection amplifier 23 to the deflection coil 25 of the flying-spot tube 24. The light beam in the flying-spot tube 24 advances towards the mark $YM_1$ in accordance with the step operation voltages in the direction normal to the marks 4. As soon as the light beam is incident on the mark $YM_1$, the beam passes through the $YM_1$ mark and diverges via condenser lens 27 onto the photomultiplier tube 28 which translates the latter beam into a corresponding electrical signal. The electrical signal is amplified by the amplifier 29. The amplified signal is discriminated by the discriminator 30 and provided on lead 104 and corresponds to the signal waveform S–3 at time $t_3$ in FIG. 6. Then, the output S–3 of the discriminator energizes the circuit 31 to cause the counter 15 to suspend its counting operation and at the same time the coded input signal "01" to be supplied via the signal line 101 for designating the column for character $b$ to be set in the X-register 12.

Next, the converter 16 converts such coded signal into an analog signal corresponding to a position of the light beam in the proximity to the mark $CM_{22}$ (as represented by the changes in waveform S–1 from time $t_3$ to $t_4$ in FIG. 6). The output signal of the converter 16 is applied to the deflection coil 25 of the flying-spot tube 24 through the adder 20 and the deflection amplifier 22. As indicated by the solid line $L_3$ in FIG. 4, the light beam in the tube 24 responsive to the voltage S–1 is positioned at point $P_2$ between the marks $CM_{21}$ and $CM_{22}$ on the extension of the mark $YM_1$. Then, the control circuit 31 operates to cause the counter 14 to initiate the counting operation via a signal line 114 and to supply the counted contents to the converter 16 together with the contents of the X-register 12. The output of the converter 16, varying in sufficiently fine width steps in response to the counted contents of the counter 14 (as represented by the changes in waveform S–1 from $t_4$ to $t_5$ in FIG. 6), is supplied to the deflection coil 25 of the flying-spot tube 24. The steps of the voltage S–1 advance the light beam in a step operation towards mark $CM_{22}$ on the extension of the horizontally oriented mark $YM_1$ as indicated by the broken line $L_4$ of FIG. 4. As soon as the beam is incident on the mark $CM_{22}$, the character column-indicating mark signal S–4 at time $t_5$ in FIG. 6 is provided on the signal line 105 in the same manner as in case of the character row-indicating mark signal S–3 is provided on the lead 104 as previously explained. The voltage S–4 energizes the circuit 31 which thereupon causes the counter 14 to suspend its counting operation.

As it is understood from the foregoing explanation, the light beam in the flying-spot tube 24 is located by this time on the mark $CM_{22}$ which is proper scanning initiation point for the electronically designated character $b$.

Then, the X- and Y-scanning sawtooth wave signal generators 18 and 19, respectively, are caused to operate in response to appropriate control voltages supplied via control circuit 31 to supply their respective output signals S–5 and S–6 at the time interval $t_5$ to $t_6$ in FIG. 6 to the deflection coil 25 of the flying-spot tube 24 through the adders 20 and 21 and the deflection amplifiers 22 and 23, respectively. The light beam in the tube 24 scans the area containing character $b$ in a manner as shown in FIG. 5. The scanning light beam which has passed through the character $b$ is converted into an electrical signal by the photomultiplier 28 through the condenser lens 27. Such electrical signal is amplified by the amplifier 29 and the amplified signal becomes, through the discriminator 30, a character pattern representing signal as a desired two-level "1" and "0" video output signal on the signal line 100, and convertible therefrom into a visible pattern for recording or displaying the character $b$.

As soon as the area containing the character $b$ has been completely scanned (corresponding to time $t_6$ in FIG. 6), both the X- and Y-scanning sawtooth wave signal generators 18 and 19 suspend their operation under the control of appropriate voltage signals supplied by the control circuit 31 and both counters 14 and 15 are cleared of their pulse counts. At the same time, a coded signal "01" designating the third row which includes the character $\tau$ to be selected and scanned and a coded signal "00" designating the column in which the marks 4 occur are respectively set in the Y-register 13 and the X-register 12 (In this case, the output signals of the converters 16 and 17 correspond respectively to changes in waveforms S–1 and S–2 from $t_6$ to $t_7$ in FIG. 6).

Thenceforth, the positioning operation of the light beam in the row direction is determined by the voltage S–2 (time $t_6$ to $t_8$ in FIG. 6) until the light beam is incident on the mark $YM_2$ (at time $t_8$) in similar manner to the aforementioned selection and scanning of the character $b$; and then, the character $\tau$ is selected in the column direction by the voltage S–1 (time $t_8$ to $t_{10}$) until the light beam is incident on the mark $CM_{32}$ (time $t_{10}$ in FIG. 6). Thereafter, the area of FIG. 4 containing the character $\tau$ is scanned to supply a corresponding two-level video signal to the signal line 100.

As mentioned above, the electron apparatus of this invention is capable of selecting and scanning any character in the character matrix with high positional precision and stability in response to binary-coded signal input for designating discrete characters in succession from a source such as a computer to obtain a character pattern signal convertible into a visual pattern so that the printed-out or displayed message characters have excellent legibility.

In FIG. 7 which illustrates another embodiment of this invention, a monoscope 42 is used as a controllable electron beam generating and an electron beam intensity/electrical signal-converting means. Whereas the embodiment of FIG. 3 employs the counters 14 and 15 to digitally compensate for the beam spot position, the beam positional compensation is performed by the analog operation in the apparatus of FIG. 7 by applying the analog signals converted by the D/A converters 16 and 17 to the adders 20 and 21 respectively together with the compensating signals from compensating circuits 40 and 41. The compensating circuits 40 and 41 cause their output signal levels to rise or fall linearly with time under the control of the control circuit 31, and those circuits 40 and 41 have the functions to hold and reset. Therefore, an integrator with the hold-reset functions can be appropriated for such compensating circuits.

The components enclosed by the dotted lines in FIG. 7 correspond to the blocks in FIG. 2 with same numerals, while the block 110 composed of the monoscope 42 and the deflection coil 25 will have the functions including the controllable beam generating means 9, the beam intensity/electrical signal conversion means 10, and the matrix 1 in the block diagram of FIG. 2. In other words, the monoscope 42 incorporates the matrix 1 structured by electrode member and is so designed as to cause an electron beam to scan the surface of the matrix 1 by use of electrical signals applied to the deflection coil 25 and to apply an electrical signal corresponding to the scanned pattern to the lead 100.

While the principles of this invention have been described above in connection with the specific preferred embodiments and the particular geometrical configurations and positions of the character row- and character column-indicating marks, it will be appreciated by those skilled in the art that there are many modifications of the pattern-generating apparatus and the character row- and character column-indicating marks. All such modifications are within the scope and spirit of the present invention.

What is claimed is:

1. A system for the electronic selection of discrete characters, comprising:

an opaque rectangular matrix including a plurality of different transparent characters spaced in parallel columns and rows and a plurality of groups of discrete transparent marks wherein marks in a first group are spaced in a column spaced from and parallel with said character columns to dispose each latter mark above one of said character rows in a direction parallel therewith and wherein marks in additional groups are disposed in proximity of said character columns, each latter mark disposed above a preselected uppermost edge of one character in each character column and each latter mark in each additional group positioned in a plane parallel with said character columns and intersecting a plane including one of said first group marks;

computer means preselecting one of said matrix characters for identification by producing a command voltage and a plurality of binary code signals of which a first signal indicates a column including said first group marks, a second signal indicating a particular row in which said preselected character is located, and a third signal indicating a particular column in which said preselected character is located;

register means for recording said first, second, and third binary signals;

voltage-responsive control means activated by said command voltage for producing voltages to energize said register means to record said binary signals;

binary code signal-converting means converting said first and second binary signals stored in said register into a first output voltage corresponding to the position of one of said first group marks during a first time interval to indicate said particular row in which said preselected character is located and said third binary signal into a second output voltage corresponding to the position of one mark of said additional mark groups during a second time interval to indicate said particular column in which said preselected character is located;

electron beam means including an electron beam movable in a coordinate pattern;

electron beam control means activated by said converting means first output voltage for energizing said beam means to move said electron beam to a first position proximate to said first group one mark during said first time interval; said last-mentioned control means further activated by said converting means second output voltage for energizing said beam means to move said electron beam to a second position proximate to said additional groups one mark during said second time interval;

pulse-counting means energized by a voltage produced by said voltage-responsive control means for activating said converting means to produce said first output voltage in successively increasing steps to energize said beam control means and thereby energize said beam means to move said electron beam from said first position to a third position incident upon said first group one mark during a third time interval occurring between said first and second time intervals to permit said electron beam to pass through said last-mentioned mark at the end of said last-mentioned interval; said pulse counting means further activated by a voltage produced by said voltage-responsive control means for activating said converting means to produce said second output voltage in successively increasing steps to energize said electron beam control means and thereby energize said electron beam means to move said electron beam from said second position to a fourth position incident upon said additional groups one mark during a fourth time interval immediately following said third time interval to permit said electron beam to pass through said last-mentioned mark at the end of said fourth time interval; said last-mentioned mark being proximate to said preselected character;

photomultiplier means responsive to said electron beam as moved to said third position and passing through said first group one mark at the end of said third time interval for producing a voltage to energize said voltage-responsive control means to terminate said voltage activating said pulse-counting means to deactivate said converting means for producing said first output voltage in said steps during said third time interval; said photomultiplier means further responsive to said electron beam as moved to said fourth position and passing through said additional groups one mark at the end of said fourth time interval for producing a voltage to energize said voltage-responsive control means to terminate said voltage activating said pulse-counting means to deactivate said converting means for producing said second output voltage in said steps during said fourth time interval;

and sawtooth voltage means activated by a voltage produced by said voltage-responsive control means for producing sawtooth voltages to energize said beam control means and thereby to energize said beam means to move said electron beam in said coordinate pattern to scan said preselected character proximate to said additional groups one mark during a fifth time interval;

whereby said photomultiplier means responsive to said electron beam passing through said preselected character as scanned produced two-level voltages to activate said voltage responsive means to transmit said last-mentioned voltages as identifying said last-mentioned character.

2. The system according to claim 1 in which said first output voltage increases in magnitude in correspondence with the increasing number of said matrix row in which said respective first group marks are located.

3. The system according to claim 2 in which said second output voltage increases in magnitude in correspondence with the increasing number of said matrix column in which said respective additional group marks are located.

4. The system according to claim 3 in which said electron beam means comprises a cathode-ray tube having a screen and deflection coils energized by said converting means first and second output voltages including said corresponding step voltage through said electron beam control means for moving said electron beam in said coordinate pattern on said screen.

5. The system according to claim 4 in which said electron beam is focused from said screen onto said first group one mark and said additional groups one mark in turn in said matrix which is positioned in front of said screen, and thereafter said electron beam passing through said preselected transparent character as scanned diverges onto said photomultiplier means which is disposed in front of said matrix, whereby said last-mentioned means responsive to said electron beam passing through said last-mentioned character as scanned is caused to produce output "1" and "0" video signals representing corresponding portions of said last-mentioned character and adjacent opaque areas of said matrix, respectively.

6. The system according to claim 5 in which said voltage-responsive control means includes means discriminating said photomultiplier means output signals for separating said last-mentioned signals into said signal responsive to said electron beam incident upon said first group one mark indicating said particular character row in which said preselected character is located, into said signal responsive to said electron beam incident upon said additional groups one mark indicating said particular character column in which said preselected character is located, and into said two-level video signals representing said preselected character as scanned; said last-mentioned signals being transmitted by said discriminating means.

7. The system according to claim 6 in which said voltage-responsive control means includes a control circuit responsive to said discriminating means separated signal indicating said particular character row in which said preselected character is located for terminating said pulse-counting means to activate said converting means to produce said first output voltage thereof in said successively increasing steps; said last-mentioned control circuit responsive to said discriminating means separated signal indicating said particular character column in which said preselected character is located for terminating said pulse-counting means to activate said converting means to produce said second voltage output thereof in said successively increasing steps.

8. Apparatus for the electronic selection of discrete characters, comprising:

an opaque rectangular matrix including a plurality of different transparent characters spaced in parallel columns and rows and a plurality of discrete transparent marks wherein marks in a first group are spaced in a column spaced from and parallel with said character columns to dispose each of said latter marks above one of said character rows in a direction parallel therewith and wherein marks in additional groups are disposed in proximity of said character columns, each latter mark disposed above a preselected uppermost edge of one character in each character column and each latter mark in each additional group positioned in a plane parallel with said character columns and intersecting a plane including one of said first group marks;

computer means preselecting one of said characters for identification by producing a command voltage and a plurality of predetermined binary code signals of which a first signal indicates a particular column in which said first group marks are located, a second signal indicates a particular row in which said preselected character is located, and a third signal indicates a particular column in which said preselected character is located;

first and second register means for recording said first and third and said second binary signals, respectively;

control circuit means activated by said computer means command voltage for producing a voltage to energize said first and second register means to record said respective first and second binary code signals;

first and second binary code signal-converting means converting said first and second register-recorded signals in such output voltages that said first converting means produces no output voltage and said second converting means produces an output voltage for identifying one of said first group marks to indicate said particular character row including said preselected character;

electron beam means including beam-deflecting means for moving an electron beam in a coordinate pattern to a random position on said matrix at a first time;

first beam control means activated by said second converting means output voltage for producing an output voltage to energize said beam-deflecting means to move said electron beam from said random position to a second position on said matrix during a first time interval;

first voltage pulse-counting means activated by a voltage provided by said control circuit means for energizing said second converting means to produce said output voltage thereof in successively increasing steps to energize said first beam movement control means and thereby said beam-deflecting means to move said electron beam during a second time interval from said second position to a third position incident upon said first group one mark which passes said electron beam therethrough at the end of said last-mentioned time interval;

photomultiplier means responsive to said electron beam passing through said last-mentioned mark for producing an output voltage at the end of said last-mentioned time interval;

voltage-discriminating means responsive to said photomultiplier output voltage for activating said control circuit means to terminate said voltage activating said first voltage pulse-counting means to terminate said voltage activating said second converting means to end the production of said second converting means output voltage steps at the termination of said second time interval; said control circuit means producing a voltage to energize said first register means to record said computer output third binary code signal; said first converting means converting said register recorded third signal into an output voltage for indicating said particular column in which said preselected character is located during a third time interval;

second beam control means energized by said last-mentioned output voltage to produce a voltage to energize said beam-deflecting means to move said electron beam from said third position to a fourth position proximate to said additional groups one mark during said third time interval;

second voltage pulse-counting means energized by a voltage provided by said control circuit means for activating said first converting means to produce said output voltage thereof in successively increasing steps to energize said second beam movement control means and thereby said beam-deflecting means to move said electron beam during a fourth time interval from said fourth position to a fifth position incident upon said additional groups one mark which is proximate to said preselected character and passes said electron beam therethrough at the end of said last-mentioned time interval; said photomultiplier means responsive to said electron beam passing through said last-mentioned mark for producing an output voltage at the end of said fourth time interval; said discriminating means responsive to said last-mentioned photomultiplier means output voltage to activate said control circuit means to terminate said voltage activating said second voltage pulse counting means thereby to terminate said voltage activating first converting means to end the production of said first converting means output voltage steps at the termination of said fourth time interval;

and first and second generating means generating first and second sawtooth voltages respectively for activating said first and second beam control means to energize said beam-deflecting means to move said beam in said coordinate pattern to scan said preselected character proximate to said last-mentioned additional groups one mark during a fifth time interval; whereby said photomultiplier means responsive to said electron beam passing through said preselected character as scanned activates said discriminating means to transmit two-level output voltages representing said last-mentioned character.

9. The apparatus according to claim 8 in which said computer means preselects a second character by producing a second command voltage and other binary-coded signals of which a first signal indicates said column including said first group marks, a second signal identifies a second one of said first group marks to indicate a further particular row in which said second character is located, and a third signal identifies said additional groups one mark to indicate said first-mentioned particular column; said control circuit means energized by said second command signal activates said first and second register means to record said other first and second signals therein; said first and second binary code converting means converting said register recorded other first and second binary-coded signals into such output voltages that said first converting means produces zero magnitude output voltage and said second converting means produces a first additional output voltage for identifying said second one of said first group marks to indicate said further particular character row; said first beam control means activated by said first additional output voltage to energize said beam-deflecting means to move said electron beam to a sixth position between said first group one and second marks during a sixth time interval; said first pulse-counting means activated by a voltage provided by said control means for energizing said second converting means to produce said first additional output voltage thereof in successively increasing steps to energize said first beam movement control means and thereby said beam-deflecting means to move said electron beam during a seventh time interval from said sixth position to a seventh position incident upon said first group second mark which passes said last-mentioned beam therethrough at the end of said seventh time interval; said photomultiplier means responsive to said electron beam passing through said last-mentioned mark for producing an output voltage indicating said further particular character row at the end of said sixth time interval; said voltage-discriminating means separating said last-mentioned output voltage to activate said control circuit means to terminate said last-mentioned voltage activating said first pulse-counting means to terminate said last-mentioned voltage activating said second converting means to end the production of said second converting means output voltage steps at the termination of said seventh time interval; said control circuit means producing a voltage to energize said first register means to record said other third binary signal therein; said first converting means converting said first register recorded other third binary signal into a second additional output voltage identifying said additional groups one mark; said second beam control means activated by said second additional output voltage to energize said beam-deflecting means to move said electron beam from said seventh position to an eighth position proximate to said additional groups one mark during an eighth time interval; said second voltage pulse-counting means energized by a voltage provided by said control circuit means for activating said first converting means to produce said second additional output voltage thereof in successively increasing steps to energize said second beam movement control means and thereby said beam-deflecting means to move said electron beam during a ninth time interval from said eight position to a ninth position incident upon said additional groups one mark, which is proximate to said preselected second character, and passes said electron beam therethrough, at the end of said ninth time interval; said photomultiplier means responsive to said electron beam passing through last-mentioned mark for producing an output voltage indicating said first-mentioned character column at the end of said ninth time interval; said voltage-discriminating means separating said last-mentioned output voltage to activate said control circuit means to terminate said last-mentioned voltage activating said second pulse-counting means to terminate said last-mentioned voltage activating said first converting means to end the production of said last-mentioned means output voltage at the termination of said ninth time interval; said first and second generating means generating said first and second sawtooth voltages, respectively, for activating said first and second beam control means to move said electron beam in said coordinate pattern to scan said second preselected character during a 10th time interval; whereby said photomultiplier means responsive to said electron beam passing through said last-mentioned character as scanned activates said discriminating means to transmit second two-level output voltages representing said last-mentioned character.

* * * * *